2,996,484
BINARY COPOLYMERS OF VINYL CHLORIDE
Richard H. Martin, Jr., Springfield, Mass., assignor to Monsanto Chemical Company, St. Louis, Mo., a corporation of Delaware
No Drawing. Filed July 31, 1959, Ser. No. 830,701
7 Claims. (Cl. 260—79.7)

The present invention relates to novel vinyl chloride interpolymers and to methods for preparing same.

Vinyl chloride homopolymers are widely employed as a surface coating resin, as a wire insulation resin, and for diverse other purposes. A relatively recent development in the art has been the employment of vinyl chloride polymer insulated wires as underground electrical cables. The insulation on such underground cables must be able to withstand severe physical punishment and for maximum utility requires vinyl chloride polymers having physicals properties superior to those of many of the presently commercially available vinyl chloride homopolymers. In particular, this development requires vinyl chloride polymers having a high tensile strength, a high 100% modulus and a high crush-resistance.

It is known that the physical properties of vinyl chloride homopolymers such as tensile strength, 100% modulus and crush-resistance can be improved by preparing the polymer under such conditions that higher molecular weights are obtained. To obtain such higher molecular weights it has heretofore been necessary to lower the polymerization temperature or to reduce the concentration of free radical generating polymerization initiator employed or both. Such modifications of the polymerization process increase the cost of preparing vinyl chloride homopolymers in that they lower the rate of polymerization and concomitantly the productive capacity of the equipment in which the polymer is prepared.

A method sometimes proposed for increasing the molecular weight of polymers is to incorporate a small quantity of a cross-linking monomer, i.e., a monomer containing two or more non-conjugated terminal ethylenic groups, in the monomer charge. This method has been used successfully with some polymer systems, but it is not generally applicable to the preparation of vinyl chloride polymers of high molecular weight. In particular, it is difficult to find cross-linking monomers which will interpolymerize with vinyl chloride at satisfactory rates. Moreover, where interpolymers can be formed, they tend to be quite heterogeneous in composition and in most cases the interpolymer contains a highly gelled fraction which is insoluble in most solvents for the vinyl chloride interpolymer. Such interpolymers, because of their heterogeneity and insoluble gel fraction, can not be employed in surface coating compositions.

It is an object of this invention to provide vinyl chloride polymers having improved physical properties.

Another object of this invention is to provide a process for preparing vinyl chloride polymers of improved physical properties, which process can be carried out in conventional polymerization equipment.

A further object of this invention is to provide a vinyl chloride polymerization process which, with no sacrifice in the rate of polymerization, yields vinyl chloride polymers of improved physical properties.

Other objects and advantages of this invention will be apparent from the following detailed description thereof.

It has been discovered that vinyl chloride polymers of improved physical properties, as compared with vinyl chloride homopolymers prepared under otherwise identical conditions, can be obtained by interpolymerizing minute but critical quantities of a diallylsulfide with vinyl chloride. Such improved vinyl chloride interpolymers contain 0.01–0.30 weight percent of the diallylsulfide with the balance of the interpolymer being vinyl chloride. The vinyl chloride interpolymers of improved physical properties are obtained at rates of polymerization which are fully equivalent to those obtained in the homopolymerization of vinyl chloride.

As noted earlier herein, it is known that the physical properties of vinyl chloride polymers such as tensile strength, 100% modulus and crush-resistance are improved as the molecular weight of the vinyl chloride polymer is increased. This is true not only for vinyl chloride polymers per se, but also for formulated vinyl chloride polymer compositions containing plasticizers, pigments, fillers and other conventional polymer compounding ingredients. Since the precision of molecular weight determinations is much higher than the precision of determinations of tensile strength, 100% modulus and crush-resistance, the comparison of polymer properties in the subsequent examples is based primarily upon polymer molecular weights, such molecular weights being expressed in terms of the specific viscosities of the polymers. All of the specific viscosities reported herein are determined on 0.4 weight percent solutions of the polymer in cyclohexanone at 25±0.50° C. The precision of the reported values is ±0.002. The formula employed for calculating specific viscosities is set forth below:

$$\text{Specific viscosity} = \frac{\text{Solution viscosity} - \text{solvent viscosity}}{\text{solvent viscosity}}$$

The following examples are set forth to illustrate more clearly the principle and practice of this invention to those skilled in the art. All parts are by weight.

EXAMPLE I

Part A

A vinyl chloride homopolymer is prepared in a stirred autoclave employing the suspension polymerization system set forth below:

| Component: | Parts by weight |
|---|---|
| Monomer | 100 |
| Water | 150 |
| Suspending agent [1] | 0.15 |
| Lauroyl peroxide | 0.25 |

[1] Equimolar interpolymer of vinyl acetate and maleic anhydride.

The polymerization is carried out at 51° C. and is completed in about 16 hours. The vinyl chloride homopolymer has a specific viscosity of 0.51.

Part B

An interpolymer consisting of 99.98 weight percent of vinyl chloride and 0.02 weight percent of diallylsulfide is prepared by the procedure of part A above and has a specific viscosity of about 0.55. In comparing this specific viscosity value with the specific viscosity of the vinyl chloride homopolymer prepared in part A above, it will be noted that, although the interpolymer contains only 0.02 weight percent of diallylsulfide, the specific viscosity of the resulting interpolymer is about 8% higher than the value obtained with the vinyl chloride homopolymer.

Part C

The vinyl chloride-diallylsulfide interpolymer of part B is compounded into the wire coating formulation set forth below:

| Component: | Parts by weight |
|---|---|
| Resin | 100 |
| Di(2-ethylhexyl)phthalate | 42 |
| Secondary plasticizer [1] | 22 |
| Clay | 20 |
| Calcium carbonate | 15 |
| Stabilizer | 8 |
| Lubricant | 1 |

[1] Hydrocarbon type.

The resulting formulation has a tensile strength of about 2600 p.s.i. and 100% modulus of about 1800 p.s.i. By way of contrast, when the vinyl chloride homopolymer of Example I, part A is substituted for the vinyl chloride-diallylsulfide interpolymer, the resulting formulation has a tensile strength and 100% modulus approximately 100 points lower.

EXAMPLE II

Example I, part B, is repeated except that the diallylsulfide contained in the polymerization system is replaced with dimethallylsulfide. The physical properties of the resulting interpolymer correspond to those of the interpolymer obtained in Example I, part B.

EXAMPLES III–VII

Five vinyl chloride-diallylsulfide interpolymers containing varying quantities of diallyl sulfide are prepared under identical polymerization conditions following the procedure of Example I, part B. The composition of the interpolymers and the specific viscosities thereof are set forth in Table I.

TABLE I

| Polymer | Wt. Percent Diallylsulfide in Interpolymer | Specific Viscosity |
|---|---|---|
| Control—Vinyl Chloride Homopolymer | 0 | 0.51 |
| Example III | 0.01 | 0.53 |
| Example IV | 0.03 | 0.58 |
| Example V | 0.05 | 0.61 |
| Example VI | 0.08 | 0.64 |
| Example VII | 0.10 | 0.68 |

As seen from the above table, each of the interpolymers containing diallylsulfide has a higher specific viscosity than the control vinyl chloride homopolymer. Each of the diallylsulfide containing interpolymers also has a higher tensile strength and 100% modulus than the control vinyl chloride homopolymer. In addition, each of the interpolymers is free of gels and is completely soluble in such solvents as cyclohexanone and nitrobenzene. Accordingly, the interpolymers are well suited for use in paints and other surface coating compositions.

The interpolymers of this invention are binary interpolymers consisting of 99.70–99.99 and preferably 99.85–99.98 weight percent of vinyl chloride and, correspondingly, 0.30–0.01 and preferably 0.15–0.02 weight percent of a diallylsulfide of the group consisting of diallylsulfide, dimethallylsulfide, monoallylmonomethallylsulfide and mixtures thereof.

The interpolymers of the invention are preferably prepared by the well-known suspension polymerization process in which the monomers are dispersed as small droplets in water and polymerized therein. Although a water-soluble interpolymer of vinyl acetate and maleic anhydride has been employed as the suspending agent in the examples herein presented, other known suspending agents such as gelatin, protective colloids, etc. may be employed if desired. The polymerizations are carried out at temperatures in the range of 30–70° C. in the presence of free radical generating polymerization initiators such as lauroyl peroxide, benzoyl peroxide, etc.

The interpolymers of this invention have higher molecular weights and better physical properties than corresponding vinyl chloride homopolymers prepared under identical polymerization conditions. Thus, the process of this invention makes possible the attainment of a superior product at no increase in cost. Alternatively, interpolymers of this invention having equivalent physical properties to vinyl chloride homopolymers can be prepared at higher polymerization temperatures. Polymerizing the interpolymers at higher temperatures increases the rate of polymerization and raises the productive capacity of the polymerization vessel in which the reaction is carried out. Thus, the interpolymers of this invention make possible the attainment of a higher productive capacity per unit of capital investment. In general, the productive capacity of a polymerization vessel for the interpolymers of this invention is approximately 30% higher than the productive capacity of the same vessel for a vinyl chloride homopolymer, both of said polymers being polymerized under conditions which give identical molecular weights.

The interpolymers of this invention may be used interchangeably with vinyl chloride homopolymers in virtually all industrial applications. The interpolymers are particularly suitable for use in the insulation of electric wire and particularly for electric wire that is to be employed as underground cable.

The above descriptions and particularly the examples are set forth by way of illustration only. Many other variations and modifications thereof will be obvious to those skilled in the art and can be made without departing from the spirit and scope of the invention herein disclosed.

What is claimed is:

1. A resinous interpolymer of monomers consisting of 99.70–99.99 weight percent of vinyl chloride and, correspondingly, 0.30–0.01 weight percent of a monomer of the group consisting of diallylsulfide, dimethallylsulfide, monoallylmonomethallylsulfide and mixtures thereof.

2. A resinous interpolymer of monomers consisting of 99.85–99.98 weight percent of vinyl chloride and, correspondingly, 0.15–0.02 weight percent of a monomer of the group consisting of diallylsulfide, dimethallylsulfide, monoallylmonomethallylsulfide and mixtures thereof.

3. A resinous interpolymer of monomers consisting of 99.85–99.98 weight percent of vinyl chloride and, correspondingly, 0.15–0.02 weight percent of diallylsulfide.

4. A resinous interpolymer of monomers consisting of 99.85–99.98 weight percent of vinyl chloride and, correspondingly, 0.15–0.02 weight percent of dimethallylsulfide.

5. An insulated electric wire comprising an electrical conductor carrying an insulating coating of a resinous interpolymer of monomers consisting of 99.70–99.99 weight percent of vinyl chloride and, correspondingly, 0.30–0.01 weight percent of a monomer of the group consisting of diallylsulfide, dimethallysufide, monoallylmonomethallylsulfide and mixtures thereof.

6. A suspension polymerization process for preparing a resinous interpolymer of a monomer mixture consisting solely of 99.70–99.99 weight percent of vinyl chloride and, correspondingly, 0.30–0.01 weight percent of a monomer of the group consisting of diallylsulfide, dimethallylsulfide, monoallylmonomethallylsulfide and mixtures thereof, which process comprises dispersing the monomers as droplets in an aqueous medium containing therein a suspending agent and polymerizing the monomers at a temperature of 30–70° C. in the presence of a free radical generating polymerization initiator.

7. A suspension polymerization process for preparing a resinous interpolymer of a monomer mixture consisting solely of 99.85–99.98 weight percent of vinyl chloride and, correspondingly, 0.15–0.02 weight percent of a monomer of the group consisting of diallylsulfide, dimethallylsulfide, monoallylmonomethallylsulfide and mixtures thereof, which process comprises dispersing the monomers as droplets in an aqueous medium containing therein a suspending agent and polymerizing the monomers at a temperature of 30–70° C. in the presence of a free radical generating polymerization initiator.

References Cited in the file of this patent

UNITED STATES PATENTS

| 2,664,414 | Morris et al. | Dec. 29, 1953 |
| 2,796,437 | Park | June 18, 1957 |

OTHER REFERENCES

Schildknecht: "Vinyl and Related Polymers," Wiley & Sons, N.Y., pp. 393–395 (1952).